United States Patent
Boxer et al.

(10) Patent No.: US 10,488,613 B2
(45) Date of Patent: Nov. 26, 2019

(54) INSTALLATION OF OPTICAL FIBER DISTRIBUTION CABLES IN A MULTI-DWELLING UNIT BUILDING

(71) Applicant: OFS FITEL, LLC, Norcross, GA (US)

(72) Inventors: Mark A Boxer, Pinetown, NC (US); Daniel Hendrickson, Roswell, GA (US); Peter A Weimann, Atlanta, GA (US)

(73) Assignee: OFS FITEL, LLC, Norcorss, GA (US)

( * ) Notice: Subject to any disclaimer, the term of this patent is extended or adjusted under 35 U.S.C. 154(b) by 0 days.

(21) Appl. No.: 15/985,231

(22) Filed: May 21, 2018

(65) Prior Publication Data

US 2018/0267268 A1 Sep. 20, 2018

Related U.S. Application Data

(62) Division of application No. 14/844,410, filed on Sep. 3, 2015, now Pat. No. 9,995,899.

(60) Provisional application No. 62/145,010, filed on Apr. 9, 2015.

(51) Int. Cl.
*G02B 6/46* (2006.01)
*G02B 6/44* (2006.01)

(52) U.S. Cl.
CPC ......... *G02B 6/4466* (2013.01); *G02B 6/4436* (2013.01); *G02B 6/4482* (2013.01)

(58) Field of Classification Search
CPC ...................................................... G02B 6/46
See application file for complete search history.

(56) References Cited

U.S. PATENT DOCUMENTS

| 7,720,338 B2 | 5/2010 | Graveston et al. |
| 8,335,417 B2 | 12/2012 | Register, III |
| 8,374,473 B2 * | 2/2013 | Weimann ............ C03C 25/1065 385/128 |
| 8,574,385 B2 | 11/2013 | Malofsky et al. |

(Continued)

FOREIGN PATENT DOCUMENTS

CA 2728837 A1 * 12/2009 ........... G02B 6/4441

OTHER PUBLICATIONS

SaskTel, "Multi-Dwelling Unit (MDU) Fibre Construction Servicing Guidelines", revision date Mar. 16, 2015. (Year: 2015).*

(Continued)

*Primary Examiner* — Michelle R Connelly
(74) *Attorney, Agent, or Firm* — Law Office of Leo Zucker, Esq.

(57) ABSTRACT

An optical fiber distribution cable for servicing living units inside a MDU building, is formed by surrounding differently colored optical fibers with a jacket having a diameter of not more than about 3.5 mm. The jacket is opaque for hiding the colored fibers at least partially from view, thus reducing or eliminating any negative visual impact of the cable when installed. The colored cable fibers are arranged so that they are visible to an installer when only the cable jacket is cut open. Connection modules are mounted at corresponding living units, and a section of the cable is placed in each module. The jacket on a cable section in a given module is cut open, and a fiber assigned to the corresponding living unit is identified by color. The fiber is cut, and a length of the fiber is removed from the cable section and stored in the given module.

10 Claims, 2 Drawing Sheets

(56) References Cited

U.S. PATENT DOCUMENTS

Figure 1:
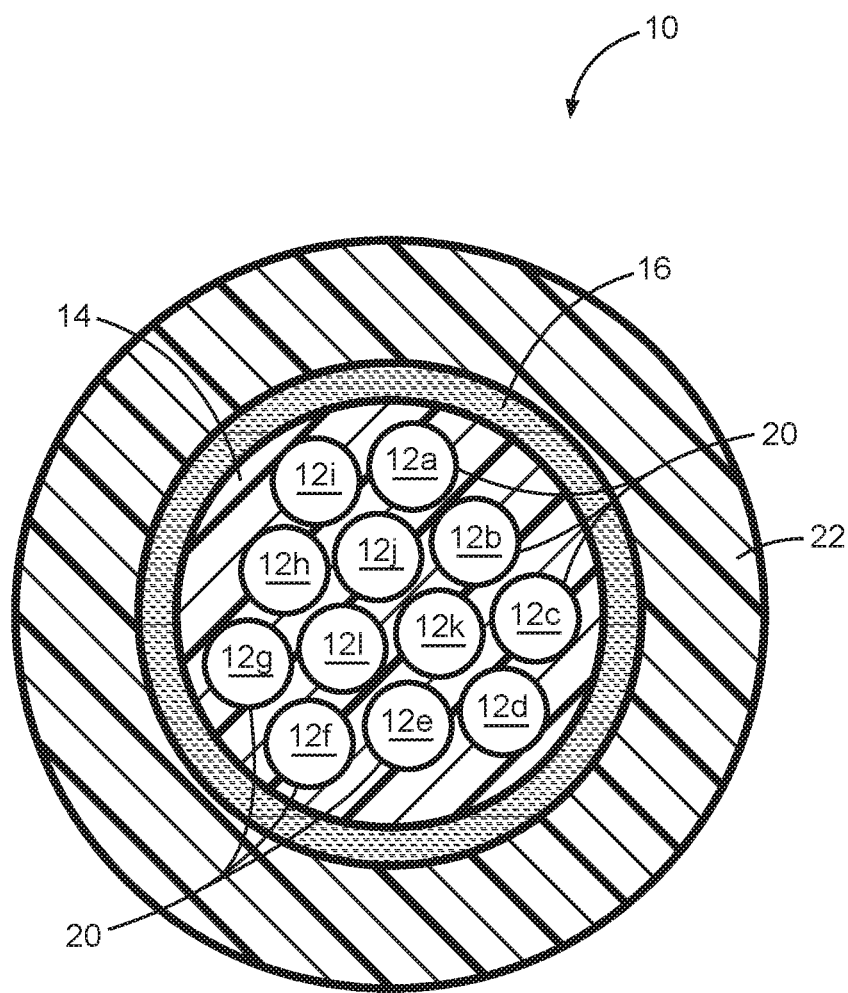

| | | | |
|---|---|---|---|
| 8,792,766 B2 | 7/2014 | Hendrickson et al. | |
| 8,842,960 B2* | 9/2014 | Berglund | G02B 6/4459 138/107 |
| 8,906,178 B2 | 12/2014 | Burek et al. | |
| 9,075,212 B2* | 7/2015 | McAlpine | G02B 6/4413 |
| 9,151,919 B2 | 10/2015 | Consonni et al. | |
| 9,435,977 B2* | 9/2016 | Blazer | B29D 11/00663 |
| 2009/0324188 A1 | 12/2009 | Berglund et al. | |
| 2010/0243096 A1* | 9/2010 | Berglund | G02B 6/4459 138/107 |
| 2011/0075977 A1* | 3/2011 | Register, III | G02B 6/4432 385/100 |
| 2012/0063731 A1* | 3/2012 | Fitz | G02B 6/4495 385/104 |
| 2012/0137510 A1* | 6/2012 | Thompson | G02B 6/4441 29/822 |
| 2012/0295486 A1* | 11/2012 | Petersen | G06F 1/00 439/658 |
| 2013/0025929 A1* | 1/2013 | Dower | G02B 6/4459 174/502 |
| 2013/0251321 A1 | 9/2013 | Bradley et al. | |
| 2013/0292035 A1* | 11/2013 | Dickinson | B65H 49/205 156/71 |
| 2014/0069681 A1* | 3/2014 | LeBlanc | H02G 3/0481 174/95 |
| 2014/0137974 A1* | 5/2014 | Lunceford | H02G 3/0487 138/108 |
| 2014/0205244 A1 | 7/2014 | Bradley | |
| 2014/0226939 A1 | 8/2014 | Boxer et al. | |
| 2015/0131953 A1* | 5/2015 | Larson | G02B 6/4441 385/109 |
| 2016/0097911 A1 | 4/2016 | George et al. | |
| 2016/0116699 A1* | 4/2016 | Larson | G02B 6/4466 385/102 |

OTHER PUBLICATIONS

Wilkes, Linnea M. ("Overcoming the Challenges of Fiber Deployment in Multiple Dwelling Units", 3MTM Business White Paper, pp. 1-11, 2012) (Year: 2012).*
3MTM "One Pass Fiber Pathway" (pp. 1-5, 2014) (Year: 2014).*
3MTM "One Pass Fiber Pathway Frequency Asked Questions" (pp. 1-4, 2011) (Year: 2011).*
3MTM "One Pass Fiber Pathway Installation Instructions" (Nov. 2011) (Year: 2011).*
3MTM "One Pass Fiber Pathway Surface Mount Small Point-of-Entry (POE) Box SM-SMALL-POE-10-IV" (pp. 1-4, Jun. 2011) (Year: 2011).*
3MTM "One Pass Fiber Pathway Installation Instructions", pp. 1-36, Mar. 2017 (Year: 2017).*
3MTM "One Pass Mini Fiber Pathway Installation Instructions", pp. 1-12, Dec. 2012 (Year: 2012).*
3MTM "Virtually Invisible, A Solution for Building Owners", pp. 1-8, 2011 (Year: 2011).*
3MTM "Virtually Invisible, A Solution for Service Providers", pp. 1-8, 2011 (Year: 2011).*
3MTM "One Pass Fiber Pathways help service provider deploy cost-effective, aesthetically appealing fiber-to-the unit network to upscale condos", pp. 1-4, 2011 (Year: 2011).*
Wilkes, Linnea, "Size Matters: When it comes to FTTH deployment in MDUs, less is more", Business White Paper, 3M 2011 (Year: 2011).*
3MTM "One Pass Mini Fiber Pathway", pp. 1-5, 2011 (Year: 2011).*
Core Telecom Systems partnered with M2FX, "MiniflexTM Plenum Cable", pp. 1-2, Aug. 2012 (Year: 2012).*
OFS FITEL, LLC, M-Pack(r) Indoor/Outdoor MDU Drop Cable, product spec sheet, two pages (Aug. 2017).
3M, One Pass Fiber Pathway—Installation Istructions, Nov. 2011.

* cited by examiner

INSTALLATION OF OPTICAL FIBER DISTRIBUTION CABLES IN A MULTI-DWELLING UNIT BUILDING

CROSS REFERENCE TO RELATED APPLICATIONS

This application is a divisional under 35 U.S.C. § 121 of our co-pending U.S. patent application Ser. No. 14/844,410 filed Sep. 3, 2015 (now U.S. Pat. No. 9,995,899 issued Jun. 12, 2018), which claims priority under 35 U.S.C. § 119(e) of our U.S. Provisional Patent Application No. 62/145,010 filed Apr. 9, 2015, the entire contents of which are incorporated by reference.

BACKGROUND OF THE INVENTION

1. Field of the Invention

The present invention relates to communication cables, and methods of installing such cables for servicing a number of living units or premises inside a multi-dwelling unit (MDU) building.

2. Discussion of the Known Art

Increasing amounts of optical fiber cabling are being installed annually to satisfy demand for fiber-to-the-home (FTTH) communication services by occupants of living units or premises in multi-dwelling unit (MDU) buildings. The services typically include, inter alia, television, telephony, and Internet access. Recent advances in optical fiber and cable technology have facilitated such installations, particularly the development of ultra bend insensitive fibers (BIFs) such as, e.g., EZ-Bend® fiber available from OFS Fitel, LLC.

Notwithstanding, building occupants are becoming increasingly sensitive to the visual impact of fiber cabling installations on the immediate surroundings. In fact, potential customers will refuse installations only because the provider's cabling will have a negative visual impact. With the increasing availability of high bandwidth wireless services, cable service providers should ensure that their installations will be virtually invisible to the building occupants when completed.

Challenges remain with respect to routing multiple optical fibers through building hallways or passageways with minimal if any negative visual impact, and without having to install costly moldings or trim to hide the fibers and the cables in which they are contained from open view. Presently known installation procedures are described below.

In one procedure, a single distribution or "breakout" cable containing multiple fibers within a common outer jacket or sheath, is adhered to a hallway wall over a path that runs next to or near the premises to be served by the fibers. Examples include MiniCord® and AccuPack® cables available from OFS Fitel, LLC. Once installed, the cables must be able to perform for more than 20 years, and comply with all applicable laws and codes pertaining to smoke and flammability. See, U.S. Pat. No. 7,720,338 (May 18, 2010), and U.S. Pub. No. 2016/0097911 (Apr. 7, 2016), both of which are incorporated by reference.

In a procedure offered by 3M™ Company under the name "One Pass Pathways," the fibers are contained inside a PVC duct having a flange with an adhesive strip that adheres the duct along a hallway wall. See U.S. Pub. No. 2009/0324188 (Dec. 31, 2009). An access box is mounted at an entry point of each living unit along the hallway, and the duct including the contained fibers is routed to pass through the access boxes. In order to connect a fiber designated for a given living unit to a drop fiber for the unit, however, the designated fiber first must be identified and cut through a window in the duct which is located at an upstream living unit along the hallway. The identified fiber is then pulled back and out of another window in the duct located at the given living unit, for connection to the drop fiber for the unit. Intermediate windows must also be cut along a section of the duct between the given living unit and the upstream unit, if the duct section forms multiple 90 degree bends. In such a case, the identified fiber must be pulled back and out of each intermediate window before being pulled out of the window at the given living unit.

In another procedure, a bundle of individual buffered fibers or small optical fiber cables are tied to one another at regular intervals over the length of the bundle, and the bundle is fastened to a hallway wall either with or without the addition of special moldings to hide the buffered fibers or cables from open view. The individual fibers are typically identified either by color-coding or by the use of a print string. In this procedure, the individual glass fibers, typically about 250 microns or larger in diameter, must be contained within a buffer coating or a small cable structure to protect the fragile glass and to ensure compliance with all applicable laws and codes pertaining to smoke and flammability.

The above procedures are not optimal, however. Typical distribution cables are relatively thick compared to the diameters of the fibers they contain. For example, the outer diameter (O.D.) of a typical 12-fiber distribution cable in which each fiber has a 900 micron tight buffer layer, is around 5 to 6 mm. The O.D. of a distribution cable containing twelve 250 micron colored fibers is still around 3 to 4 mm. Therefore, the cables are still likely to be noticed by persons nearby.

In addition, a tied bundle of fibers each having an O.D. as small as 900 microns or 1.2 mm, can also be noticed when routed along a hallway wall. As mentioned, each fiber in the bundle typically has a different color so an installer can identify the fiber and connect it to a drop fiber for a designated living unit. Thus, all the colored fibers in the bundle will remain visible and contribute to the negative visual impact of the installation, especially if the bundle is routed over or near a lightly colored wall, ceiling, or molding. Even if the fibers within the bundle are all of the same color, they can have a negative visual impact on installation due to the uneven surface of the bundle, resulting in some surfaces being shadowed.

An installation system known as EZ-Bend InvisiLight®, available from OFS Fitel, LLC, enables a drop fiber to be installed inside a living unit by the use of a tool that routes and adheres a flame-retardant, plastic-coated 900 micron fiber along existing moldings, corners between ceilings and walls, and corners between walls and moldings, leaving the entire installation virtually invisible inside the living unit. See U.S. Pat. No. 8,792,766 (Jul. 29, 2014); U.S. Pat. No. 8,574,385 (Nov. 5, 2013); and U.S. Pat. No. 8,906,178 (Dec. 9, 2014), all of which are incorporated by reference.

In view of the above, there remains a need for a procedure for installing an optical fiber distribution cable containing fibers of different colors for easy identification inside a MDU building, in a manner that has little if any negative visual impact on the building occupants once the cable is installed along a hallway or other passageway to service living units in the building.

SUMMARY OF THE INVENTION

According to the invention, a procedure for installing an optical fiber distribution cable in a MDU building for providing communication services to living units inside the building, includes providing a number of bend insensitive optical fibers each having a different color coating to identify the fiber, and surrounding the fibers with a flame-retardant outer jacket to form a fiber distribution cable having an outer diameter of not more than about 3.5 mm. The outer jacket of the cable is formed sufficiently opaque to hide the colored coatings on the fibers at least partially from view, thus reducing or eliminating any negative visual impact of the cable when the cable is installed along a wall or other visible surface to service living units inside the MDU building.

The optical fibers of the cable are arranged so that the colored coatings on the fibers are visible to an installer when only the outer jacket of the cable is cut open. Each living unit inside the MDU building to be serviced by an optical fiber of the distribution cable is identified, a connection module is mounted at or near each unit, and a section of the cable is placed in each connection module.

The outer jacket on the cable section placed in a given connection module at or near a corresponding living unit is cut open, and an optical fiber assigned to the living unit is identified by the color of the coating on the fiber. The identified fiber is cut, and a length of the fiber is removed from the cable section and stored in the given connection module for connection to a drop fiber for the living unit.

For a better understanding of the invention, reference is made to the following description taken in conjunction with the accompanying drawing and the appended claims.

BRIEF DESCRIPTION OF THE DRAWING FIGURES

Figure 2:
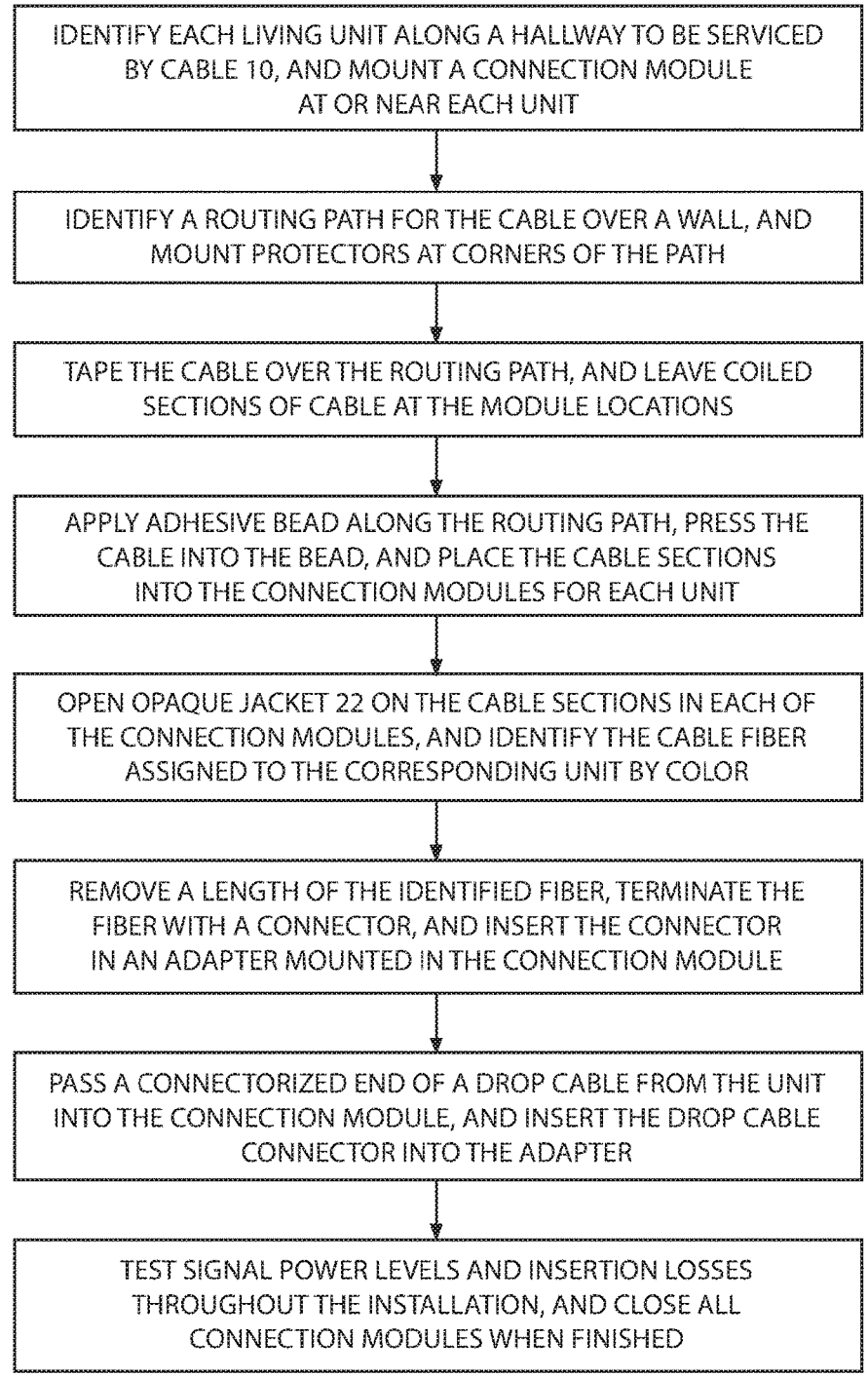

In the drawing:

FIG. 1 is a cross-sectional profile of an optical fiber distribution or breakout cable according to the invention; and FIG. 2 is a flow chart showing steps of a building hallway installation procedure for the cable of FIG. 1, according to the invention.

DETAILED DESCRIPTION OF THE INVENTION

FIG. 1 is a cross-sectional profile of an optical fiber distribution or breakout cable 10, according to the invention. As detailed below, the cable 10 is especially suitable for routing along a building hallway to service a number of living units or premises in a multi-dwelling unit (MDU) building, without having a negative visual or aesthetic impact on observers nearby. Persons skilled in the art may find the cable 10 to be particularly useful for other applications as well.

In the disclosed embodiment, the cable 10 contains twelve coated optical fibers 12a, 12b, . . . , 12l each of which may be assigned to service a particular living unit in a MDU building. The fibers may include, for example, one or more of the earlier mentioned EZ-Bend® fibers each having a 125 micron diameter cladding and intended for both in-home and MDU building applications. The cladding is coated with a thermoset polymeric coating 20 made from UV-curable acrylate oligomers to an outer diameter (O.D.) of approximately 240 microns, and the coating is typically colored to identify each fiber when the fibers are contained in a multi-fiber cable like the cable 10. Cables that contain EZ-Bend® fibers can be routed around corners and deployed using traditional copper wire cabling techniques. Other fibers that are bend-insensitive and capable of providing communication services to customer premises may also be used in the cable 10.

The cable 10 has a relatively soft, curable inner layer 14 that surrounds the coated fibers 12a-12l, and a harder curable outer layer 16 that surrounds the inner layer 14. If the layers 14, 16 are cured by UV light, then the layers are preferably clear or translucent in order to allow enough UV energy to pass through them for curing during manufacture of the cable 10. The O.D. of the outer layer 16 in the cable 10 is approximately 1.35 mm. Further details of the layers 14, 16 are disclosed in the earlier mentioned U.S. Pat. No. 7,720,338 and are incorporated by reference.

As mentioned, each one of the cable fibers 12a to 12l has a coating 20 of a different color so an installer can identify the fiber, and then connect it to a living unit to which the fiber has been assigned. The colors of the coatings on the twelve fibers should comply with industry color standards such as TIA-598, namely; blue, orange, green, brown, slate, white, red, black, yellow, violet, rose, and aqua.

If the layers 14, 16 are clear or translucent for the purpose of accepting light energy to cure the layers, then the colored coatings 20 of the fibers 12a to 12l will be visible through the outer layer 16. Thus, according to the invention, the cable 10 is provided with an outer jacket 22 of a mineral filled, at least partially opaque flame-retardant polymer compound, for example, by pressure extruding a 0.35 mm thick layer of the compound at a melt temperature of approximately 350° F. over the cured clear outer layer 16. The jacket 22 not only hides the colored coatings 20 on the cable fibers 12a-12l from view, but also makes the cable 10 flame retardant to meet regulations of various countries pertaining to the composition of materials in communication cables.

The polymer compound for the jacket 22 is selected to conform to local fire safety standards, for example, type OFN non-conductive, type OFNG non-conductive general purpose, or type OFNR non-conductive riser in the U.S.A.; or EN 13501-6 Euroclass E for the European Union. An example of a compound that meets present standards in the United States is SmokeGuard IV 1320, which is a low-smoke PVC compound containing aluminum trihydrate manufactured by AlphaGary Corporation, Leominster, Mass., USA. An example of a low-smoke zero-halogen material that could meet present Euroclass requirements is Megolon 8142-NT, a compound containing magnesium hydroxide filler, also manufactured by AlphaGary Corporation.

It has been found that a thickness of only 0.2 mm for the jacket 22 of the 12-fiber cable 10 will enable the cable to meet the type OFN fire safety requirements, allowing the cable 12 to have an O.D. of only about 1.75 mm. To meet the type OFNR or FT-4 safety requirements, however, a jacket thickness of approximately 0.75 mm may be required, with a cable O.D. of about 2.85 mm. Smaller diameter cables containing only four, six, or eight fibers can also be provided.

Other possible PVC compounds for the cable jacket 22 include AlphaGary SmokeGuard™ III 1011E which is believed to contain between 15 and 25% aluminum trihydrate filler by weight, and Teknor Apex FireGuard™ 910 A18, also believed to contain between 15 and 25% aluminum trihydrate filler by weight.

Other low-smoke zero-halogen compounds for the jacket 22 include AlphaGary Megolon™ 8142 NT which is believed to contain between 60 and 70% magnesium hydroxide by weight, and PolyOne ECCOH™ 6638, also believed to contain between 60 and 70% magnesium hydroxide by weight.

Hydrate mineral fillers such as aluminum trihydrate $Al(OH)_3$ or magnesium hydroxide $Mg(OH)_2$ are both used in concentrations ranging from approximately 10% to 70% by weight to increase the flame retardancy of plastics materials. Upon exposure to fire, the mineral filled materials emit water vapor. Other mineral fillers, such as calcium carbonate or clay can also be used to reduce cost. An additional benefit of mineral fillers is that they provide opacity to the cable jacket 22. Other pigments can be added to impart specific colors, for example, titanium oxide $TiO_2$ will impart a bright white color to the cable jacket 22 and allow the cable 10 to blend into or color match a like-colored surface over which the cable is routed. Other pigments or colorants may be used to reduce or eliminate any negative visual impact of the cable 10 when bonded to a colored hallway wall or other openly visible interior building surface.

In addition, local fire safety codes often require that cabling be marked with a printed legend to indicate its fire safety rating. Any printing on the cable jacket 22 could make the cable more noticeable when installed, however. Accordingly, in a preferred embodiment, the cable jacket 22 is marked by an inked string of text not more than about 1.34 mm high, and lightly colored, e.g., silver or gray. Thus, the text string can only be seen and read when viewed relatively close by a fire marshal, and remain unnoticed at a distance.

The cable jacket 22 should be capable of bonding via a suitable non-toxic adhesive to common wall or other interior structural surfaces, for example, painted or unpainted wood, paneling, sheetrock, lath and plaster, concrete block, brick, stucco, wallpaper, and texturing. Also, for the first 10 to 20 minutes after the cable 10 is bonded to an underlying surface, an installer must be able to reposition the cable if necessary in order to correct a mistake or to accommodate variations from the initially determined routing path.

EXAMPLE

FIG. 2 shows an example of a hallway installation procedure for the cable 10 inside a MDU building, including the connection of the cable fibers to corresponding living units or premises along the hallway.

1. Identify all the living units or premises to be serviced by the cable 10. For each premises, determine a location on a wall of the hallway where a connection module can be mounted next to or near the premises, and secure the module in place. The module should be mounted as close as possible to the hallway ceiling, and overlie an opening through which an end of a terminated drop fiber can pass from inside the premises to enter the module. The connection module can be mounted either above the door of the living unit in the hallway, or, alternatively, inside the living unit near the door. To facilitate safe and fast wall penetrations, the module should not be mounted in the vicinity of a wall stud, or over wiring known to be present inside the wall.

2. Identify a routing path along the hallway wall over which the cable 10 is to be permanently installed, and wipe the path with a clean cloth. A corner protector should be mounted over each corner along the path. To blend with the environment and reduce visibility, the cable 10 can be routed inside corners of ceilings and walls, ceilings and crown moldings, walls and crown moldings, and walls and door moldings. The path can also include a vertical corner formed by adjacent walls.

3. If necessary, pull and/or blow the cable 10 through a riser micro-duct that may be pre-installed.

4. Secure a free end of the cable 10 as supplied on a spool, and pay out and temporarily tape the cable along the identified routing path. Leave a one meter (approx. three foot) coiled section of the cable 10 at the determined location of each connection module along the path.

5. Starting from the end of the routing path closer to the fiber network, apply a small bead of an engineered adhesive along the path, and press the cable 10 into the adhesive bead. Alternatively, the cable 10 may be pressed into the adhesive starting from the premises end of the path if easier than from the network end. The coiled cable sections are placed directly inside the connection modules at each living unit for those modules mounted on the hallway wall. For modules mounted inside a living unit, the associated cable section is looped and passed through a pre-installed tube to enter the living unit, and the section is placed inside the module there. The foregoing is repeated until all the coiled sections of the cable 10 are placed in the connection modules for all of the units to be serviced.

6. Connect each cable fiber to its assigned living unit by cutting into the opaque cable jacket 22 of the coiled cable section inside the unit's connection module, and exposing the clear layers 14, 16 through which each of the differently colored fibers 12a to 12l will be visible. Identify the assigned cable fiber, remove a length of the fiber from the cable section, and splice a connector on the free end of the fiber. Plug the fiber connector into one end of an adapter which may be supplied together with the module, and plug the connector at the end of the living unit's drop cable into the opposite end of the adapter.

7. Test the entire installation for acceptable optical signal power levels and insertion losses using known test standards and equipment. Once the overall installation is determined to be operating properly, all the connection modules should be kept closed.

While the foregoing represents preferred embodiments of the present invention, it will be understood by persons skilled in the art that various changes, modifications, and additions can be made without departing from the spirit and scope of the invention. For example, as disclosed herein, the cable 10 contains twelve fibers. Other embodiments of the cable may have higher or lower fiber counts to accommodate installations of various scales and routing configurations. Accordingly, the invention includes all such changes, modifications, and additions as are within the bounds of the following claims.

We claim:

1. A procedure for installing an optical fiber distribution cable in a multi-dwelling unit (MDU) building for providing communication services to a number of living units along a hallway inside the building, comprising:

providing a number of bend insensitive optical fibers each of which has a coating of a different color to identify the fiber;

surrounding the optical fibers with a flame-retardant outer jacket to form a distribution cable for containing the optical fibers, wherein the outer jacket has an outer diameter of not more than about 3.5 mm;

forming the outer jacket sufficiently opaque to hide the colored coatings on the optical fibers at least partially from view, thereby reducing or eliminating any negative visual impact of the distribution cable when the cable is installed along a hallway wall or other visible building surface to service living units inside the MDU building;

arranging the optical fibers of the distribution cable so that the colored coatings on the fibers are visible to an installer once the outer jacket of the cable is cut;

identifying each living unit along the hallway inside the MDU building to be serviced by an optical fiber contained in the distribution cable, determining a corresponding installation path for the cable along the hallway, and mounting a connection module on a wall at or near each living unit along the path so that a drop fiber can pass from inside the living unit to enter the connection module mounted on the wall at or near the living unit;

placing a coiled section of the distribution cable containing the optical fibers in each of the connection modules;

at a given living unit along the installation path, cutting into the outer jacket of the coiled section of the distribution cable placed in the connection module mounted on the wall at or near the given living unit, and identifying an optical fiber assigned to the given living unit by the color of the coating on the fiber; and removing a length of the identified optical fiber from among the number of optical fibers contained in the coiled section of the distribution cable placed in the connection module, and storing the length of the identified fiber in the connection module for connection to the drop fiber for the given living unit.

2. The procedure of claim 1, wherein the number of bend insensitive optical fibers contained in the distribution cable is twelve, and the surrounding step is performed so that the distribution cable has an outer diameter of not more than about 2.85 mm.

3. The procedure of claim 1, including applying an adhesive along an underlying surface of the determined installation path for the distribution cable, and pressing the cable into the adhesive to bond the cable to the underlying surface.

4. The procedure of claim 1, including connecting the length of the identified fiber stored in the connection module mounted on the wall at or near the given living unit, to the drop cable for the given living unit.

5. The procedure of claim 1, including coloring the outer jacket of the distribution cable to match or blend with the color of the underlying surface of the installation path.

6. The procedure of claim 1, including containing a total of twelve or more bend insensitive optical fibers in the distribution cable.

7. The procedure of claim 1, including marking the outer jacket of the distribution cable with a printed legend to indicate a fire safety rating for the cable.

8. The procedure of claim 7, including forming the printed legend as a string of lightly colored text of a size that can only be seen and read when viewed at a relatively close distance.

9. The procedure of claim 1, including forming the outer jacket of the distribution cable from a mineral filled, at least partially opaque flame-retardant polymer compound.

10. The procedure of claim 1, including forming the outer jacket of the distribution cable to be capable of bonding via a non-toxic adhesive to a wall or other interior building surface.

* * * * *